United States Patent [19]

Renaudin et al.

[11] Patent Number: 5,024,803
[45] Date of Patent: Jun. 18, 1991

[54] EMERGENCY DEVICE FOR THE CONTROL OF THE DISPLACEMENT FOR A CARRIER CONVEYING A NUCLEAR FUEL ASSEMBLY

[76] Inventors: Robert Renaudin, 233, rue de Charenton, 75012 Paris, France; Bruno Tchatalian, 34, rue deu Président Wilson, 78280 Le Pecq, France

[21] Appl. No.: 406,013

[22] Filed: Sep. 12, 1989

[30] Foreign Application Priority Data

Sep. 14, 1988 [FR] France .................. 88 11979

[51] Int. Cl.⁵ .......................... G21C 19/18
[52] U.S. Cl. ..................... 376/270; 254/DIG. 14
[58] Field of Search ............ 376/270, 264, 261, 260; 104/183, 162, 173.1, 176, 178; 254/387, DIG. 14; 414/146

[56] References Cited

U.S. PATENT DOCUMENTS 4,053,067 10/1977 Katz et al. .................... 376/268

Primary Examiner—Daniel D. Wasil
Attorney, Agent, or Firm—Pollock, Vande Sande & Priddy

[57] ABSTRACT

An emergency device for the control of the displacement of a conveying carrier for a nuclear fuel assembly, in which the conveying carrier (6) moves under the effect of a push-pull chain (15) actuated by a driving mechanism causing, according to the direction, its winding on itself in spiral so as to pull the carrier, or its unwinding by forming then a carrier rigid pushing element, including a connecting member between the chain and the carrier, formed of two portions (27,38) connected to each other by a pin which can be broken when required in order to disconnect the two portions and to free the carrier from the chain.

Breaking of the pin is due to the effect of a traction exerted remotely from the carrier on a control cable (16) such that, after breaking, the cable can apply a traction on the carrier so as to bring it back freely, independently of the chain, to a predetermined position. The connecting member between the chain (15) and the carrier (6) includes a fastening member (27) carried or rigidly connected to the carrier and connected to two parallel flanges (25,26) of a link of the chain by a transverse spindle (38), the fastening member and the spindle being connected by the pin (41) placed parallel to the link flanges.

11 Claims, 5 Drawing Sheets

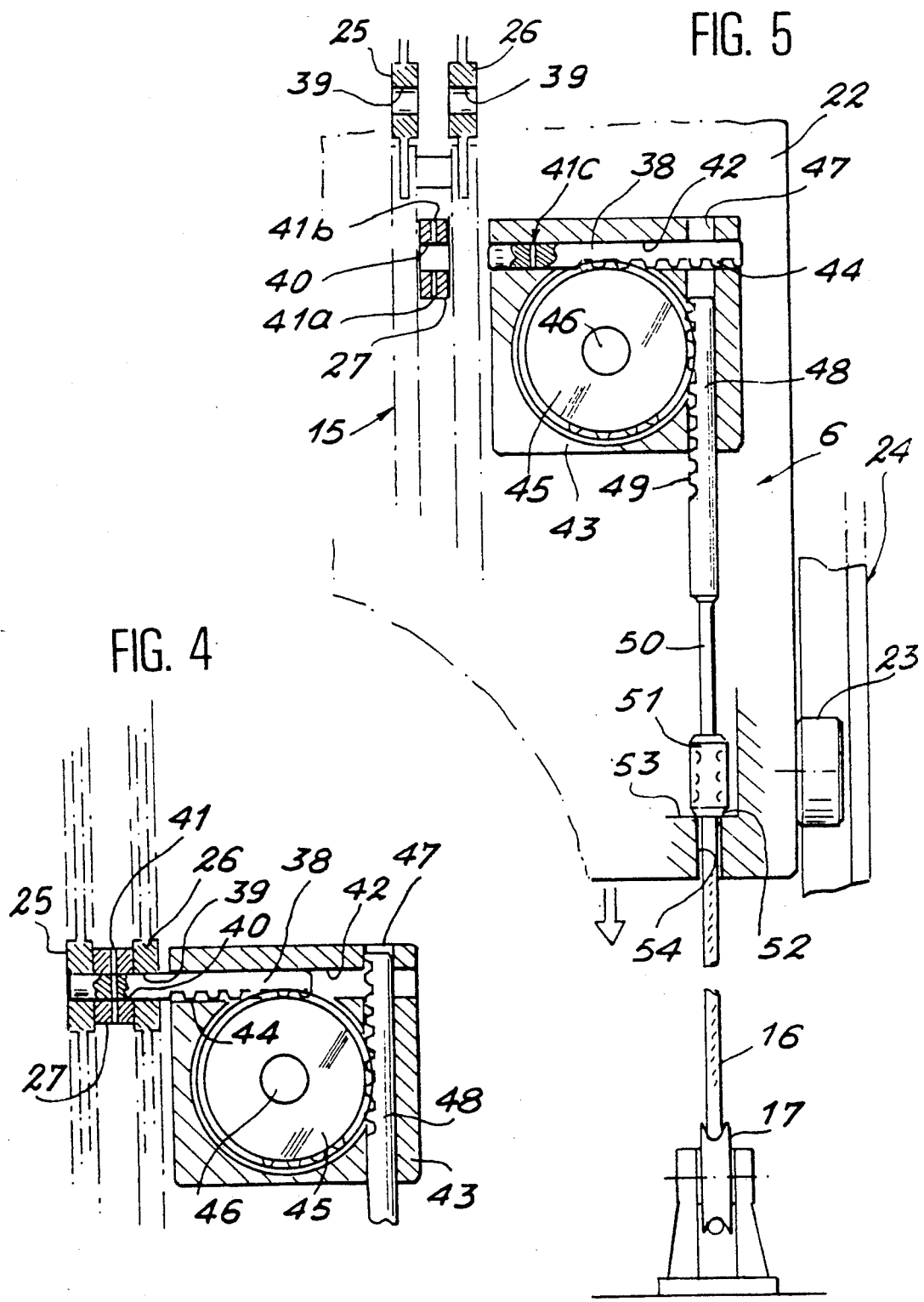

EMERGENCY DEVICE FOR THE CONTROL OF THE DISPLACEMENT FOR A CARRIER CONVEYING A NUCLEAR FUEL ASSEMBLY

FIELD OF THE INVENTION

The present invention relates to an emergency device which allows, upon the occurence of an incident and particularly the blocking of a conveying carrier transporting nuclear fuel assemblies inside and outside the enclosure of a reactor, automatic detachment of the carrier from the chain or other mechanical control means normally used for its displacement, and then its safe return to a predetermined position.

BACKGROUND OF THE INVENTION

During loading and unloading of a nuclear reactor with the fuel assemblies forming the core of the latter, a conveying carrier is normally used for supporting and displacing at least one new assembly to be put in position in the core, or the used assembly removed from the latter and to be transferred to a storage well which is outside the reactor enclosure. The carrier moves during its displacement at a convenient depth underneath the level of the protection water, by rolling on rails or similar guiding means between a receiving or removal position of a new or used assembly, provided outside the enclosure, and a loading or unloading position of the assembly, arranged inside said enclosure and in which it is removed from or positioned on the carrier. Between these two positions, the carrier slides or rolls on its rails, usually under the effect of a chain adapted to exert a pushing effort or reversely a traction effort, on the carrier, said chain being preferably controlled in the vicinity of the receiving or removal position of the assemblies outside the enclosure. The chain has the property of winding on itself as the carrier is drawn toward the latter position, enabling it to occupy only a reduced space inside the storage well, and also having sufficient rigidity when unwound to assume the function of a jack stem or arm of the carrier for bringing the latter to its loading or unloading position inside the reactor enclosure.

In prior art mechanism of this type the conveying carrier generally includes several controls, which require accurate coordination and necessitate the use of numerous and specialized personnel, distributed in the successive handling stations. Problems result when, for some reason, there is jamming or blockage of these control means, the carrier then running the risk of not being able to be brought back to its receiving or removal position for the new or used elements outside the enclosure. In such a case, it becomes necessary to resort to unblocking means which are heavy and cumbersome and the operation of which is complex, for example by using a pole, possibly telecontrolled, and which, through the head of protective water, acts on a rocker adapted to pivotably disengage the teeth of a drive pinion from a control rack for displacement of the carrier, before it is in position to bring it back, for example by means of a cable connected to the carrier frame and winding itself at its opposite end on the drum of winch.

A conveying carrier for nuclear fuel assembly, adapted to be transferred in the reactor building or in an annex building, with a reciprocating motion inside a horizontal communication duct along the axis of which it moves on carrying rails, is known from French patent FR-A-2 234 637. The movement of the carrier is effected with the assistance of a pusher arm having an end rigidly connected to a double chain, which is in turn driven on control pinions. When an incident occurs, particularly when the carrier is immobilized inside the reactor building, it is necessary to bring it back outside of said building; to this effect, one uses a cable provided with a clevis retained by a shearing pin, so that, when traction is applied to the cable, the pin breaks, thereby allowing the clevis to be blocked inside the end of the pusher arm, in order to permit retraction of the latter and that of the carrier due to the cable moving back upwardly. However, in this arrangement the pusher arm always remains rigidly connected to the carrier; if the incident is due to the arm itself, for example when blocked in the communication duct, the device fails and the cable does not allow the carrier to be returned to the annex building.

SUMMARY OF THE INVENTION

The present invention relates to an emergency device avoiding these disadvantages, by providing a significant simplification of the mechanisms required for control of the displacement of the conveying carrier, particularly when an incident occurs and when the carrier is blocked. The device allows the carrier to be easily disconnected from its control members, particularly from the handling chain, and to be returned to a position outside the reactor enclosure, these operations being effected in a safe and rapid manner from a single station, thereby reducing both the requirement for personnel and the duration of their possible exposure to the effects of a hostile environment.

To this effect, the device in consideration, in which the conveying carrier moves under the effect of a push-pull chain actuated by a driving mechanism causing, depending on the direction, its winding on itself in spiral so as to pull the carrier, or its unwinding by forming then a carrier rigid pushing element, including a connecting member between the chain and the carrier, formed of two portions connected to each other by a pin adapted to be broken when required for disconnecting the two portions and to free the carrier from the chain, is characterized in that breakage of the pin is due to the effect of traction exerted remotely from the carrier on a control cable in such manner that, after breaking, the cable can apply a traction on the carrier so as to bring it back freely, independently of the chain, to a predetermined position, the connecting member between the chain and the carrier including a fastening member carried by or rigidly connected to the carrier and connected to the two parallel flanges of a link of the chain by means of a transverse spindle, the fastening member and the spindle being connected by the pin placed parallel to the link flanges.

During normal operation, the control of the carrier displacement is effected by the driving of the chain whose structure, which is known per se, is such that according to the direction of its winding or unwinding it pulls or pushes the carrier from one position to another, respectively inside and outside the reactor enclosure. When there is a blockage of the carrier or chain, causing the immobilization of the carrier in some intermediate position, the device according to the invention allows the chain to be separated remotely, safely and rapidly from the carrier, by acting on a cable which first causes the breaking of the connecting pin, then exerts on the carrier a traction force bringing it back to a chosen position, outside the enclosure, where necessary repairs and positioning of a replacement pin may take place.

According to another feature of the device the transverse spindle, which extends freely through aligned passages in the link flanges and the fastening member, respectively, is secured against motion with respect to the fastening member by means of the pin during normal operation of the carrier. When an incident occurs, a force exerted on the spindle parallel to itself causes breakage of the pin, the spindle disengaging from the fastening member and from the flanges, while disconnecting these two elements from one another and allowing then the displacement of the carrier independently of the chain.

Preferably, the transverse spindle is slidably mounted in a first housing of a support block, carried by the carrier and including a rack actuated by a flat pinion, which is mounted so as to rotate freely on an axis perpendicular to the pinion and rigidly connected to the support block.

According to another feature, the pinion actuating the spindle rack is driven in rotation by a second spindle mounted in the support block inside a second housing located in the plane of the first housing but perpendicularly to it, this second spindle also including a rack in mesh with the pinion, such that the rotation of the latter selectively simultaneous and opposite displacements of the spindles, respectively toward the inside and the outside of the support block.

According to still to another feature, the second spindle is rigidly connected at its end outside the support block to a connecting end-piece with the traction cable. Advantageously, the end-piece includes a whorl, adapted to come to bear at the end of the stem stroke and under the effect of the pinion on an abutment rigidly connected to the carrier in such manner that a traction effort exerted on the cable once the pin is broken brings the whorl against the abutment, thereby causing the entrainment of the carrier by the cable. Moreover, the pinion support block is mounted inside a tight casing which is supported by the pinion rotation axis, said pinion being in turn disposed underneath the carrier lower face.

In a preferred embodiment of the invention, the traction cable is actuated by a winch, situated at a distance from the carrier and on the drum of which is wound the cable, guided toward the carrier up to the connecting end-piece by return pullies. Preferably also, the cable winds itself on a mobile pulley, provided with a counter-weight exerting a constant tension on the cable, which remains permanently taut, whatever the position of the carrier.

According still to another feature of the device, the carrier includes wheels moving on rails extending parallel to the working plane of the push-pull chain. Preferably, the chain winds itself on a control toothed wheel, driven by a return mechanism from a reduction motor unit.

BRIEF DESCRIPTION OF THE DRAWINGS

Other features of the emergency device for the control of the displacement of a conveying carrier, according to the invention, will become more apparent from the following description of a preferred embodiment, given by way of example with reference to the accompanying drawings.

FIGS. 4 and 5 are detailed views showing more particularly the mechanism ensuring the breaking of the connecting pin.

DESCRIPTION OF PREFERRED EMBODIMENT

Figure 1:
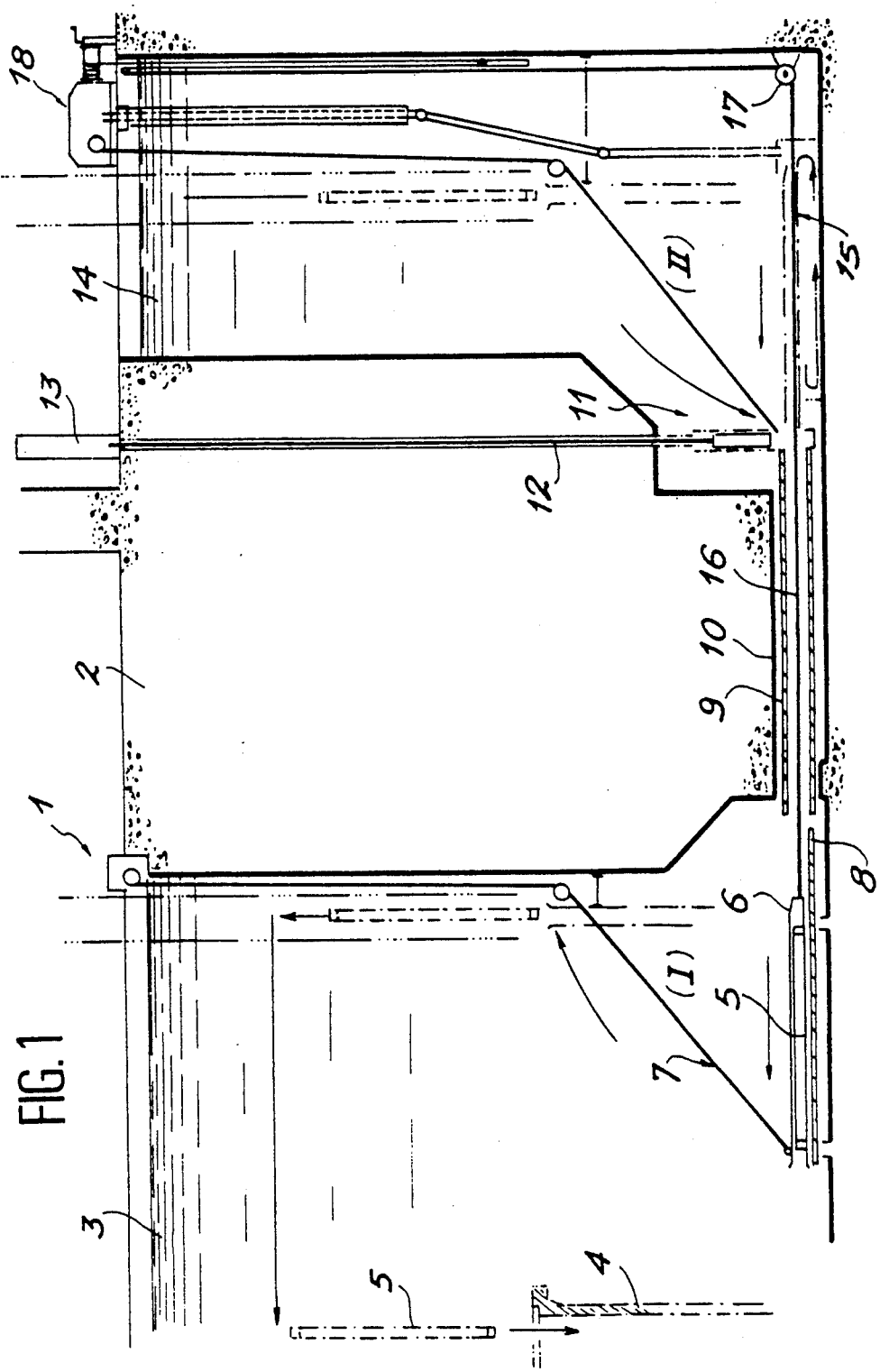
FIG. 1 is a partial schematic view of the enclosure of a nuclear reactor and of a storage well for fuel assemblies, the transfer of which inside or outside the enclosure is ensured by means of a conveying carrier and of a device according to the invention.

FIG. 1 shows schematically a portion 1 of the enclosure of a nuclear reactor, notably of the so-called pressurized water type, including thick concrete protection walls 2 defining an inner zone 3 filled with water. A portion of the reactor shell is shown at 4, reference 5 denoting a nuclear fuel assembly adapted to be introduced or removed from the reactor core.

The reactor structure as well as the means used for loading or unloading the core with the fuel assembly are well known in the art and therefore require no particular description, said means moreover having no direct relation with the object of the present invention. In FIG. 1, a fuel assembly 5 shown in solid lines is mounted in a substantially horizontal position, carried by a conveying carrier 6 brought into the inner zone 3, in a space (I) of the latter which forms a conventional a loading-unloading station. The mechanism allowing gripping the fuel assembly 5 on its carrier, transferring it from its horizontal position to a vertical position, and then transferring it so as to place it in vertical alignment with the core above shell 4, is schematically denoted as a whole by reference numeral 7.

The conveying carrier 6 moves on a rolling path 8 provided in the bottom of enclosure 1, so as to pass from space (I) and from the loading-unloading station to a space (II) situated on the other side of the protection wall 2 with respect to space (I) and forming a receiving or removal station for the fuel assemblies, to selectively allow the positioning on the carrier of a new fuel assembly to be introduced in the core, or reversely receiving and removing a used fuel assembly removed from said core. During its transfer from space (I) toward space (II) or vice versa, the conveying carrier 6 passes through a guiding tunnel 9 provided in a passage 10 formed in the lower portion of wall 2, whereby said tunnel can be opened or closed by the closing block 11 of a lock-gate mounted at the lower end of a control stem 12, operated from the outside of the enclosure by a control mechanism 13.

Space (II), where the removal or receiving station is placed, is filled with water 14 to a height necessary to provide a convenient protection to the outer environment during handling of the fuel assemblies 5, and particularly those extracted from the core which are highly radio-active. The control of the reciprocating movements of conveying carrier 6 from one to the other of spaces (I) and (II) is provided by means of a handling chain 15 the details of which will be explained hereinafter. Moreover, one of the ends of carrier 6 is connected to a traction cable 16 allowing the carrier to be returned inside space (II) to the receiving or removal station when an incident occurs on handling chain 15. Cable 16 is returned on a guide pulley 17 toward a control winch 18 provided at the upper portion of enclosure 1.

Figure 2:
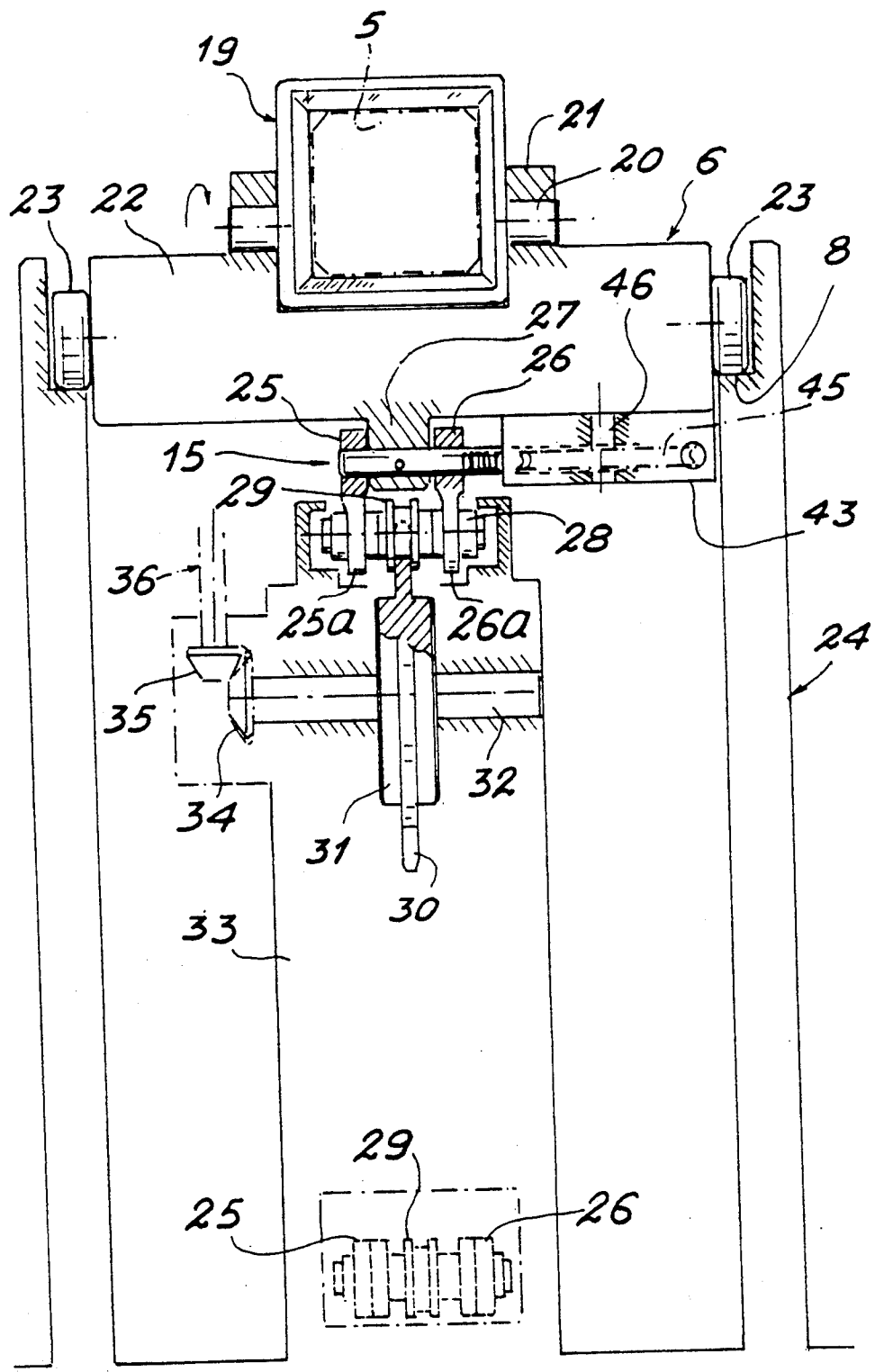
FIG. 2 is a vertical sectional view on a larger scale of a conveying carrier and and of the inventive device.
Figure 3:
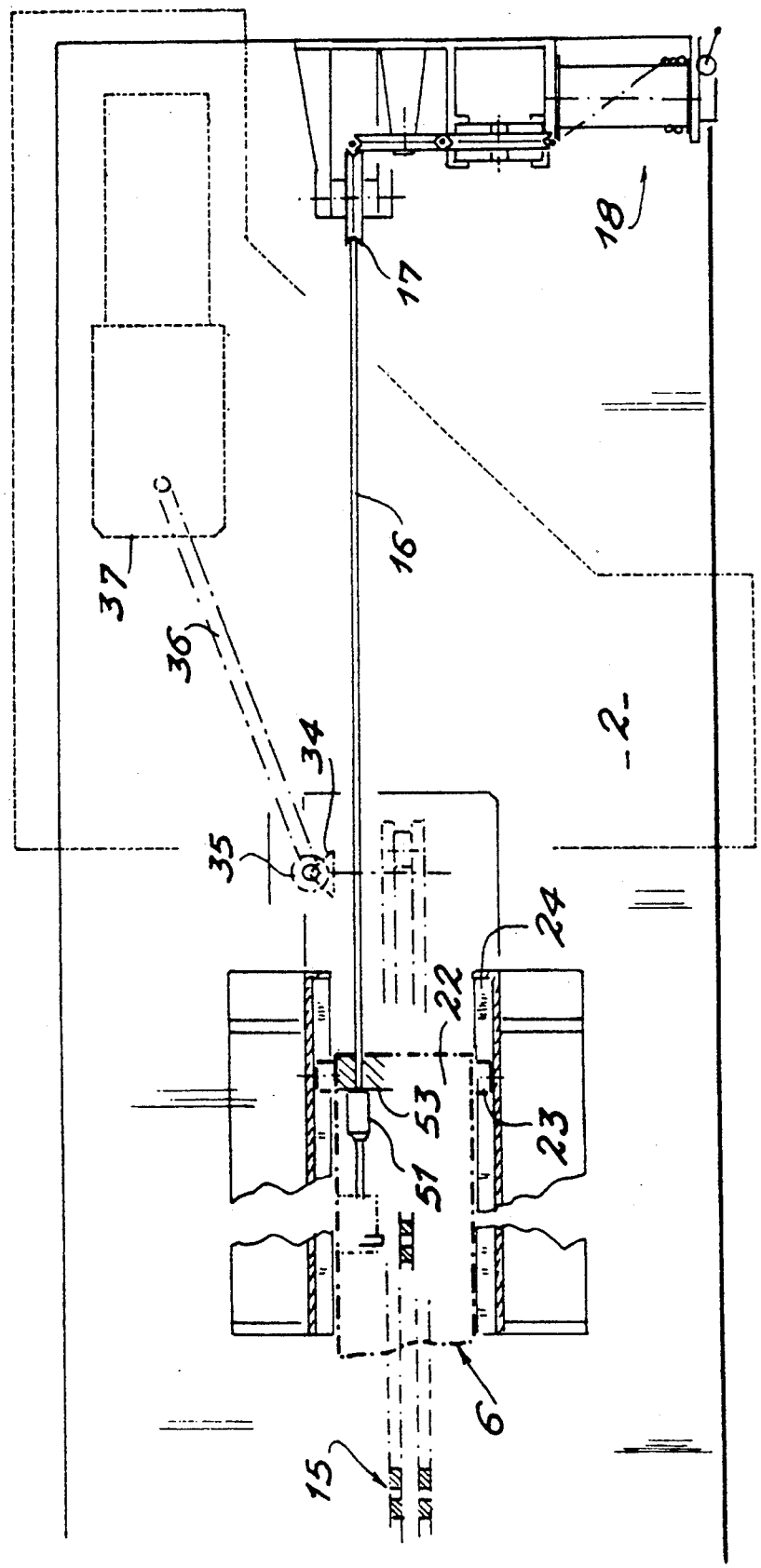
FIG. 3 is a top plan view and also on a larger scale of the carrier control mechanism.

FIGS. 2 and 3 show in greater detail a particular embodiment of the conveying carrier 6 and of the fuel assembly 5 monted in the latter inside a carrying structure 19 (FIG. 2), provided with side trunnions 20 pivoting inside bearings 21 so as to allow assembly 5 to be lifted respect to the carrier for loading or unloading operations, briefly mentioned hereinabove.

Carrier 6 includes a support chassis 22 provided laterally with wheels 23 for the displacement of the carrier on path 8, particularly on carrying walls 24 conveniently arranged for receiving and guiding said wheels.

The operating chain 15 is a chain of the "push-pull" type and includes successive links (FIGS. 3 and 4) each formed with two parallel side flanges, respectively 25 and 26. Between the flanges of any one of the chain links, preferably at the end of the chain, a fastening member 27 is engaged underneath the chassis 22 of carrier 6, flanges 25 and 26 being rigidly connected to said fastening member 27 by a connection means the details of which will be explained hereinafter.

Flanges 25 and 26 extend into tongues 25a and 25a through which extends a connection shaft 28, including substantially in its central portion a double flange 29 defining a groove in which the teeth 30 of a control wheel 31 are successively engaged. The latter is rigidly connected to a horizontal shaft 32 and rotates inside a casing 33 provided between the carrier walls 24 of the rolling path 8. At one end of shaft 32 is supported a bevel pinion 34 in mesh with a pinion of same profile 35 keyed at the end of a control shaft 36, driven by an appropriate motor reduction 37 (FIG. 3).

Chain 15, the detailed description of which does not directly refer to the invention, allows, depending on the direction of rotation of wheel 31, displacement of the conveying carrier 6 to the right or to the left in FIG. 1, respectively in the direction of spaces (I) or (II). When the chain winds itself into a spiral, it pulls the carrier to the removal or receiving station in space (II); on the contrary, when the chain is unwound, it becomes rigid and forms a one arm jack of the carrier toward space (I) in the direction of the loading and unloading station.

According to the invention, the connection between the fastening member 27 rigidly connected to the carrier and the end link of chain 15, notably with the side flanges 25 and 26 of said link, is provided by means of a transverse spindle 38 penetrating bores in register, respectively 39 and 40, formed in the flanges on the one hand and in the fastening member on the other hand, as shown in FIG. 4. Moreover, spindle 38 is secured against motion with respect to fastening member 27, and therefore flanges 25 and 26 and also chain 15, by means of a pin 41 extending through the fastening element and the spindle, parallel to the link flanges.

Spindle 38 is mounted inside a first housing 42 of corresponding shape, provided inside a support block 43. Said spindle 38 includes on on one of its sides a rectilinear rack 44, the housing 42 being open laterally to allow the teeth of a pinion 45 mounted in the support block 43 to mesh with rack 44. Pinion 45 is rigidly connected to shaft 46 extending vertically underneath chassis 22 of the conveying carrier (FIG. 2), said pinion 45 being substantially horizontal when such conditions prevail.

The support block 43 also includes a second housing 47 extending perpendicularly to the direction of the first housing 42 so as to intersect the latter. Inside the second housing 42 is mounted a second spindle 48 including, like the first one, a rectilinear rack 49 adapted to mesh with the teeth of pinion 45. As may be seen in FIGS. 4 and 5, the relative position of spindles 38 and 48 is determined by the construction in such manner that, depending on the direction of pinion 45, one of the spindles penetrates inside support block 43 in its associated housing while the other extends outside the block by passing through the end of its own housing, and vice versa.

Spindle 48 is rigidly connected outside block 43 to a stem 50, ending into a whorl 51 on which is attached the end of cable 16, the connection between the whorl and the cable being effected by any appropriate means, e.g., by crimping, screwing or other clamping and connection means. Whorl 51 includes one end 52 adapted for come to bear against an abutment 53 formed in alignment underneath chassis 22, with the cable 16 extending freely through said abutment via a passage 54.

Figure 6:
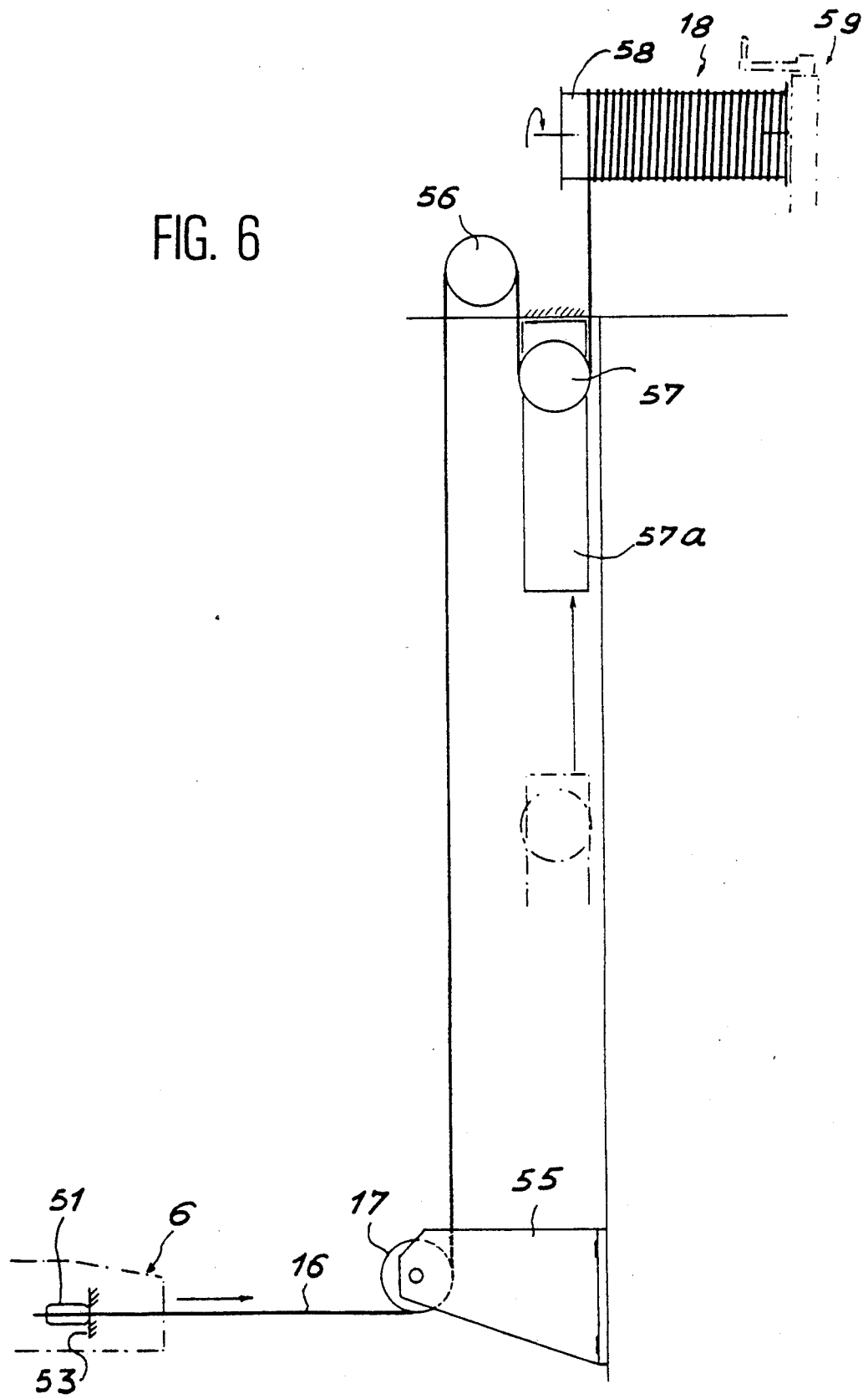
FIG. 6 shows a detail of the control winch for the carrier traction cable.

FIG. 6 shows schematically the control means for cable 16. Said cable is first passed around pulley 17, the position of which is fixed at the bottom of enclosure 14 by a support bracket 55, then upwardly to a second pulley 56. After passing around the latter, cable 16 is tackled on a mobile pulley 57 supporting a counterweight 57a which exerts force on the cable maintaining it permanently taut. Beyond pulley 57, the cable winds itself on drum 58 of winch 18, controlled by a crank 59 or any equivalent driving means.

The operation of the device according to the invention is easily understood from the explanations already given.

Under normal operation conditions, the movements of carrier 6 between its two spaces (I) and (II), i.e., the loading and unloading station on the one hand, and the removal-receiving station on the other hand, are provided by means of the push-pull chain 15 which, according to the direction of its winding, causes the displacement of the carrier on its rolling path 8 on one side or the other.

When an incident occurs and notably when there is a jamming or blockage of carrier 6 or of chain 15, it is of course important to be able to bring the carrier back rapidly to space (II) so as to be able to proceed, under acceptable conditions, to the necessary repairs and to the immediate removal of the assembly it supports, particularly if it is an irradiated assembly removed from the core.

To the effect, this emergency device according to the invention consists in controlling, via winch 18, cable 16 in the direction where the latter exterts a traction force on spindle 48 engaged in its housing 47, the second spindle 38 being in that case in the position shown in FIG. 4 where it rigidly connects fastening member 27 flanges 25 and 26 of the end link of chain 15. The force thus exerted on the cable, transmitted from spindle 48 to spindle 38 via pinion 45, is applied to the connection pin 41 which, when judiciously calculated, can also abruptly break into three fragments, 41a and 41b remaining immobile inside fastening member 27, and 41c captive inside spindle 38 and permitting the removal of said spindle and simultaneously the progressive exit of the other spindle 48, respectively in and out of said block 43.

After being broken, fastening member 27 is freed from chain 15, carrier 6 which is rigidly connected to the fastening member being no longer connected to the chain.

As the force is still applied on cable 16, whorl 51 comes to bear via its end 52 on abutment 53 provided on chassis 22. At that moment, cable 16 can itself entrain the carrier and bring it back from any position of the latter on its rolling path 8 toward the receiving station (II) in the outer portion of enclosure 3.

It should be noted that the whole of these operations is controlled remotely by a single operator, controlling only the drum 58 of winch 18. The contact established between whorl 51 and abutment 53 triggers by any known means a signal which is a confirmation for the operator to start driving the carrier and retracting it, until it reaches its final position.

The invention thus provides a simple and particularly safe device enabling, when an incident occurs on the carrier handling chain, the return of the latter to a position which allows recovery of the fuel assembly which it supports. Cable 16 assumes under any circumstances the function imparted to it, which is the return of the carrier, particularly by using a tackle and counterweight maintaining it permanently in a taut state.

Of course, it goes without saying that the system according to the invention for the return, should an incident occur, of any remotely controlled mobile element, particularly of the freight-elevator type, or a loading member for a thermal treatment oven, a rolling mill, etc.

We claim:

1. An emergency device for control of displacement of a conveying carrier for a nuclear fuel assembly, in which said conveying carrier moves under the effect of a push-pull chain actuated by a driving mechanism selectively causing winding of said chain on itself in spiral so as to pull said carrier, and unwinding of said chain by forming a rigid carrier pushing element, including a connecting member between said chain and said carrier, said connecting member being formed of two portions connected to each other by a pin adapted to be broken when required for disconnecting the two portions and to free the carrier from the chain, wherein the breaking of said pin is due to the effect of traction exerted remotely from said carrier on a control cable, such that, after breaking, the cable can apply a traction on said carrier so as to bring it back freely, independently of said chain, to a predetermined position, the connecting member between said chain and said carrier including a fastening member attached to said carrier and connected to two parallel flanges of a link of said chain by means of a transverse spindle, said fastening member and said spindle being connected by said pin, said pin being parallel to said flanges.

2. An emergency device according to claim 1, wherein the transverse spindle extends freely through passages formed in alignment in said flanges and said fastening member, respectively.

3. An emergency device according to claim 1, wherein said transverse spindle is slidably mounted in a first housing of a support block, carried by said carrier and including a rack actuated by a flat pinion mounted so as to rotate freely on an axis perpendicular to the pinion and rigidly connected to the support block.

4. An emergency device according to claim 3, wherein said pinion actuating said rack of said spindle is driven in rotation by a second spindle mounted in the support block inside a second housing located in a plane of said first housing but perpendicularly to it, said second spindle also including a rack in mesh with the pinion in such manner that the rotation of the latter causes simultaneous and opposite displacement of the spindles, respectively toward the inside and the outside of the support block.

5. An emergency device according to claim 4, wherein said second spindle is rigidly connected at its end outside said support block to a member connecting with said traction cable.

6. An emergency device according to claim 5, wherein said connecting member includes a whorl adapted to bear at the end of the stroke of the second spindle under the effect of the pinion on an abutment rigidly connected to said carrier, in such manner that a traction effort exerted on said cable once said pin is broken brings said whorl against the abutment, thereby causing entrainment of said carrier by said cable.

7. An emergency device according to claim 3, wherein said support block of said pinion is mounted inside a tight casing which is supported by said axis of rotation pinion, said pinion being in turn disposed underneath a lower face of said carrier.

8. An emergency device according to claim 1, wherein said control cable is actuated by a winch located at a distance from said carrier and on a drum on which is wound said cable, guided toward said carrier by return pulleys.

9. An emergency device according to claim 8, wherein said cable winds itself on a mobile pulley provided with a counterweight exerting constant tension on said cable, which remains permanently taut in all positions of said carrier.

10. An emergency device according to claim 1, wherein said carrier includes wheels moving on rails extending parallel to a working plane of said push-pull chain.

11. An emergency device according to claim 10, wherein said chain winds itself on a toothed control driven by a return mechanism from a motor reduction unit.

* * * * *